(12) United States Patent
Batista

(10) Patent No.: US 11,976,638 B2
(45) Date of Patent: May 7, 2024

(54) ACTIVE WIND GENERATOR

(71) Applicant: Felipe Batista, Reading, PA (US)

(72) Inventor: Felipe Batista, Reading, PA (US)

( * ) Notice: Subject to any disclaimer, the term of this patent is extended or adjusted under 35 U.S.C. 154(b) by 0 days.

(21) Appl. No.: 18/012,804

(22) PCT Filed: Jun. 21, 2022

(86) PCT No.: PCT/US2022/034316
§ 371 (c)(1),
(2) Date: Dec. 23, 2022

(87) PCT Pub. No.: WO2023/287555
PCT Pub. Date: Jan. 19, 2023

(65) Prior Publication Data
US 2023/0279839 A1    Sep. 7, 2023

Related U.S. Application Data

(60) Provisional application No. 63/222,756, filed on Jul. 16, 2021.

(51) Int. Cl.
*F03D 9/25*  (2016.01)
*H02K 7/116* (2006.01)
*H02K 7/18*  (2006.01)

(52) U.S. Cl.
CPC .............. *F03D 9/25* (2016.05); *H02K 7/116* (2013.01); *H02K 7/183* (2013.01); *F05B 2220/706* (2013.01)

(58) Field of Classification Search
CPC .......... F03D 9/25; H02K 7/116; H02K 7/183; F05B 2220/706
See application file for complete search history.

(56) References Cited

U.S. PATENT DOCUMENTS

2011/0156400 A1\* 6/2011 Lowe ........................ F03G 7/10
290/55

\* cited by examiner

*Primary Examiner* — Viet P Nguyen
(74) *Attorney, Agent, or Firm* — Fraline J. Allgaier

(57) ABSTRACT

A wind generator for creating electrical energy using a magnetic levitation electrical production system is provided. The wind generator includes a central hub, a conductive track, and a plurality of tubes. The magnetic field source of a plurality of tubes and a conductive track are aligned such that the magnetic field source of the plurality of tubes repels the magnetic field source of the conductive track and wherein a propulsive force induces the circular travel of the plurality of tubes in the conductive track. The circular travel of a plurality of tubes creates a stepwise production of electrical energy for transfer to a power collection system.

5 Claims, 16 Drawing Sheets

ACTIVE WIND GENERATOR

RELATED APPLICATIONS

This application claims priority to U.S. Provisional Patent Application Ser. No. 63/222,756 filed Jul. 16, 2021.

FIELD OF THE INVENTION

The present disclosure is directed towards the construction and design of a magnetic levitation electrical generation system. More particularly, the subject matter is the means by which magnetic sources provide propulsion, levitation, and stabilization to a plurality of tubes for constant levitation and high-speed circular traveling in a magnetized conductive track for wind creation and production of electrical energy.

BACKGROUND OF THE INVENTION

Research relating to the magnetic levitation of mechanical devices for levitation and forward propulsion is advancing. A vast majority of these devices are commercialized, however, most of the resources are consigned to research and development. In most cases, attempts at the magnetic levitation of these devices is done by magnetic forces for a stepwise propulsion, levitation, and a later stabilized positioning over rails. The bearing and travel functions, which were traditionally effected by wheels, are created by mounted electromagnets.

As the world's population increases and becomes more and more reliant on electronic devices, our energy demands will only increase. The so-called fossil fuels (e.g., coal, oil, and natural gas) have been used as an energy source in electrical power plants since at least 1882, when the first coal-burning public power plant was built in London. In such power plants, the burning of fossil fuels boils water, and the pressure of the resulting steam is harnessed to cause a turbine to spin and rotate a magnet within coils of a conducting material. In this way, mechanical energy is used to generate electrical energy using a version of Michal Faraday's electric dynamo. Of course, burning fossil fuels has its drawbacks. For one, there is a finite supply that needs to be extracted from the planet before it can be used. The extraction process is expensive, dangerous, and polluting and requires large amounts of fossil fuels. Access to fossil fuels is unequal with some countries having comparatively large reserves while other countries do not.

Additionally, the availability of such fuels is often dependent on socio-political conditions which can cause the supply to be irregular. Burning such fuels also generates greenhouse gases such as carbon dioxide. These emissions can harm the environment and contribute to climate change. Signees to the Paris Agreement have pledged to reduce the amounts of greenhouse gases released from their countries. These laws generally increase the cost of generating electrical energy from fossil fuels. Fossil fuels are increasingly becoming less attractive as energy sources in part to these issues. One solution, perhaps the only solution, to the problems encountered with continued dependence on fossil fuels to generate electricity is to use other energy sources to generate electrical energy. Renewable energy from sources such as wind, solar, and geothermal are available commercially, and the cost of electricity produced using these methods is decreasing, and it will continue to decrease as the technologies are refined. Renewable energy sources can solve the problems created by the use of fossil fuels for electrical energy production. One potential drawback associated with renewable energy sources is that their energy production may be affected by factors beyond control: solar arrays aren't of much use at night, and a wind farm is only productive when the wind is blowing. To mitigate such problems, excess energy produced during peak conditions can be stored in batteries for use during a nadir of production. Unfortunately, the manufacture of the batteries needed to store renewable or "green" energy is not without its problems. Current batteries are expensive to produce due in large part to the scarcity of the required materials. It would be preferable if a generator could continually generate electricity without regard to weather conditions and the continual need for outside sources of energy.

Wind turbines in today's market don't produce electricity when the wind isn't blowing and always have to be installed where favorable wind exists. Usually strong winds are far from the cities where the electricity is needed this means that in many cases hundreds of miles of transmission lines have to be installed thus increasing the production cost.

Therefore, there is a long-felt and unmet need in the art to provide the wind generation system of the current invention. The bearing and travel functions, which were traditionally effected by exposure to wind, are created by magnetic fields that are connected to a central hub with a reinforced tunnel-like conductive track. This magnetic levitation electrical generation system has advantages in that there is fast travel and wind-generation of a plurality of tubes in a noiseless, low vibration, and environmentally friendly environment. The magnetic levitation electrical generation system can be envisioned in a plurality of areas as a next-generation means of creating electrical energy. It can play a role in saving energy—and contribute to the commercialization of novel methods of producing energy.

SUMMARY

In order to accomplish the objectives of the present disclosure, there is provided an active wind generator for creating electrical energy using a magnetic levitation electrical production system. In an embodiment, the wind generator comprises a conductive track of circular configuration and having magnetic field sources provided therein and wherein the magnetic field sources are electrically connected to a power source for delivering electrical current thereto. A plurality of tubes receive at least one magnetic field source with a magnetic pole orientation. The magnetic field source is identical to the magnetic field source of the conductive track. The lumen of each of the plurality of tubes housing at least one turbine having blades for rotation and gears for rotatable attachment to the generator provided therein for the production of electrical energy. With further increased magnetism surrounding the turbine, the attached turbine levitates within the tubes as it rotates. The magnetic field source of the plurality of tubes and the conductive track are allinged such that the magnetic field source of the plurality of tubes repels the magnetic field source of the conductive track and wherein a propulsive force induces the circular travel of the plurality of tubes in the conductive track. The circular travel of a plurality of tubes creates a stepwise production of electrical energy for transfer to a power collection system.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

BRIEF DESCRIPTION OF THE DRAWINGS

The present embodiments are illustrated by way of the figures of the accompanying drawings, which may not necessarily be to scale, in which like references indicate similar elements, and in which.

DETAILED DESCRIPTION

Figure 1:
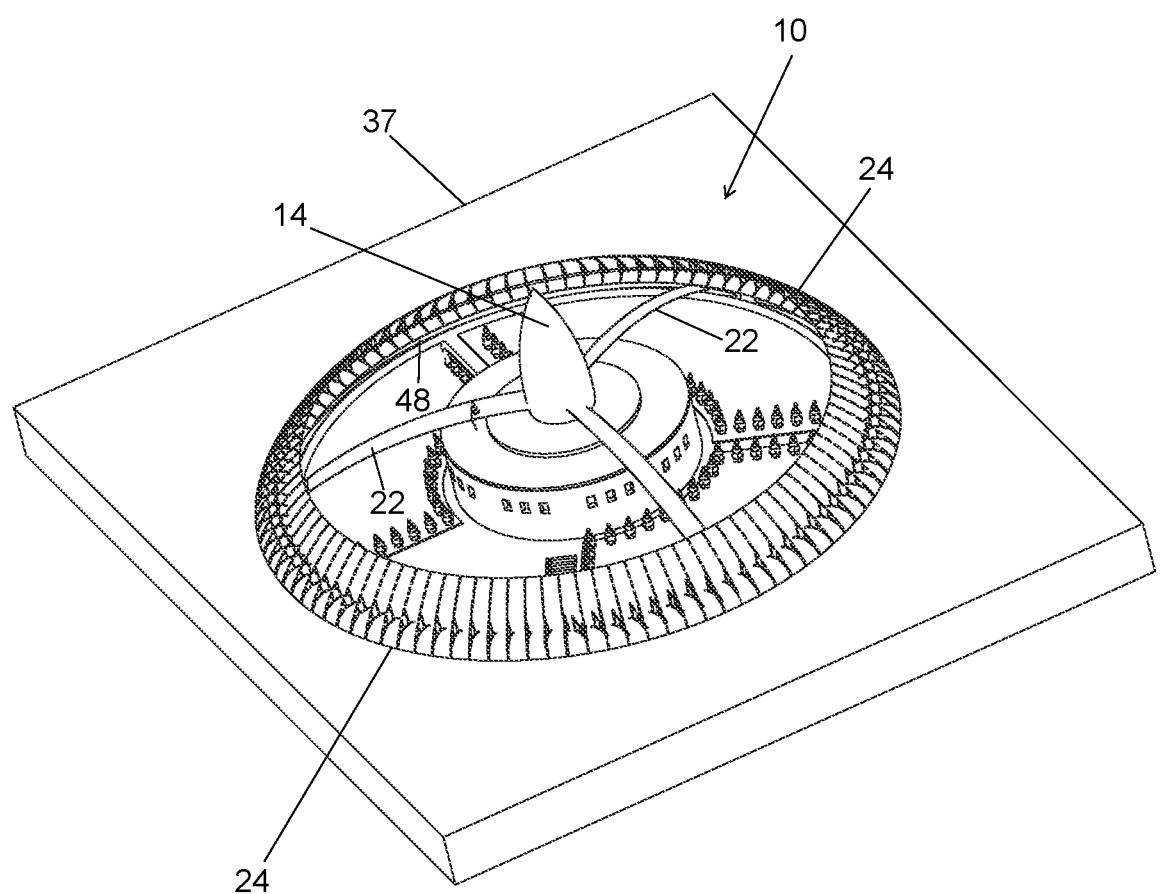
FIG. 1 is a perspective view of an active wind generator showing a possible layout thereof including a structure and conductive tracks reinforced in a submerged state.

The following detailed description is the best-contemplated mode of carrying out the disclosure. Although the disclosure has been explained in relation to its preferred embodiment, it is to be understood that many other possible modifications and variations can be made without departing from the spirit and scope of the invention.

Therefore, the active wind generator 10 may be used in various types of settings including homes, businesses, scattered throughout cities, agricultural farms, power plants, central power grids, and the same to provide the cost-wise electrical generation and mass-production needs for consumers. Sequence converters can be used to transfer the generated electricity to a grid and a transformer of standard construction amps up the voltage before transmission The plurality of arms 22 associated with the active wind generator 10 therewith can be constructed with improved mechanical strength and with a magnetic gear system to improve the high-speed ratio of the plurality of tubes 18. Performance enhancing blades 68, twist or no-twist blade configurations, or the same can be aligned in a desired manner to improve rotational speed or more complex rotation capacities. Vertical, pitched, width mounted, or propeller-like designs can be used for the turbine blades 68 and the diameter in relation to the interior wall of the turbine can be designed based on the propulsion needs of a manufacturer of the active wind generator 10.

It may be necessary to reinforce the conductive track 16 of the active wind generator 10 to a structure 37 wherein the conductive track 16 can be laid in the ground, provided in movable elongated surfaces, aligned with buildings, or constructed in similar reinforced locations to provide electricity to a facility and to allow user access therein and to the housing of the central hub 14. This would necessitate a plurality of tubular and track joining techniques that could be utilized to reinforce the conductive track 16 in a submerged condition.

The structure 37 associated therewith may be a covered structure 37 to prevent leakage of electric current 56, moisture, or other external elements and wherein the cover can be provided by tin roof covering, fixed roofing, or the same in a partially covered, slidable or retractable configuration. The external elements being naturally adapted to enter the elongated transverse passage 48 provided in the outer wall 42 of the conductive track 16 upon relative movement of the arms 22.

It is contemplated that the description, taken with the drawings, makes apparent to those skilled in the art how an embodiment of the disclosure may be practiced. Variations of this embodiment may include, but are not limited to, additional, fewer or no arms 22, additional or fewer tubes 18, or a differently shaped conductive track 16. For example in an embodiment with fewer or no arms 22, an induction power collection can be used.

It can be appreciated that the implementation of a turbine 66 or a similar device for producing continuous wind within a semi-enclosed space can include devices in which blades, wheels, or rotors can revolve with the high-speed blowing of generated wind. For example, piston and cylinder systems, cross flow turbines, pumps, vertical hoisting, and the like can be considered as rotation sources for providing the kinetic energy transfer requirements for the active wind generator 10.

In an embodiment, a magnetic field is induced in a conductive material and the magnetic field thereby levitating, stabilizing, and propelling the tubes 18 within the conductive track 16. Various types of magnetic field sources 54 and materials are contemplated for use and to provide the magnetic polarity. The magnetic field sources 54 can include permanent magnets, current-carrying conductors, and electromagnets of the resistant, superconductor, and hybrid types to produce the desired magnetic field using a power source 28. The magnetic sources of similar polarities can be placed at predetermined distances, zigzag patterns, a staggered-type arrangement, a homogenous field, polarized magnets with fluxes directed with a predominant direction of the conductive track 16, regular intervals, or similar arrangements in the rails 52 and on the tubes 18. Additional guide means such as additional magnetic sources, sensors, braking, and microprocessors, can be mounted on the rails 52 and the tubes 18 so as to manipulate the acceleration to generate electricity.

A sophisticated system of logistics and management structure can be used to transfer the generated electricity with the parameters required by the consumers. The use of the invention makes it possible to increase the effectiveness and reduce losses on transmission of electrical energy from a source to a consumer over unlimited distances and to reduce the cost of electrical energy transmission systems.

Figure 2:
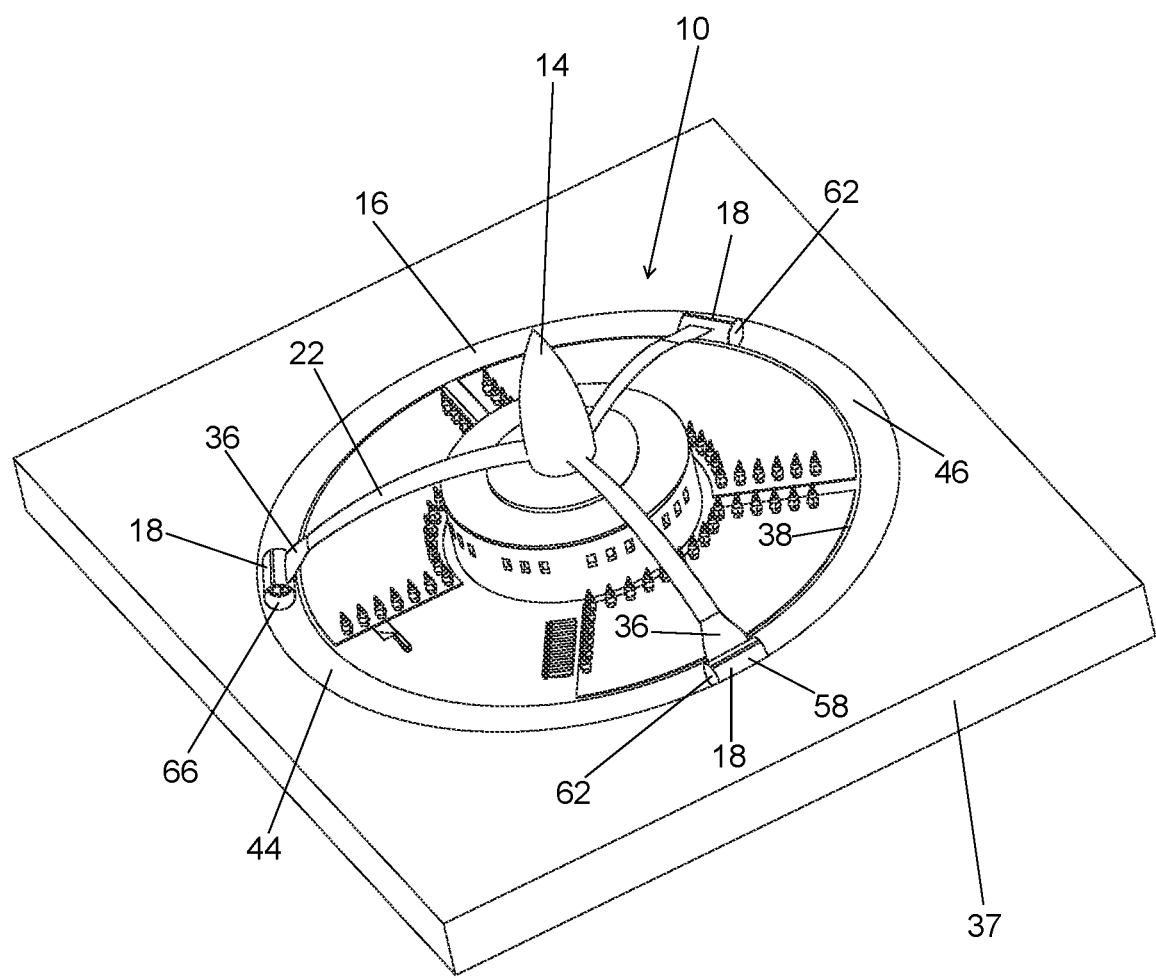
FIG. 2 is a top view of an active wind generator showing levitation in the lumen of the conductive track by a plurality of tubes.
Figure 3:
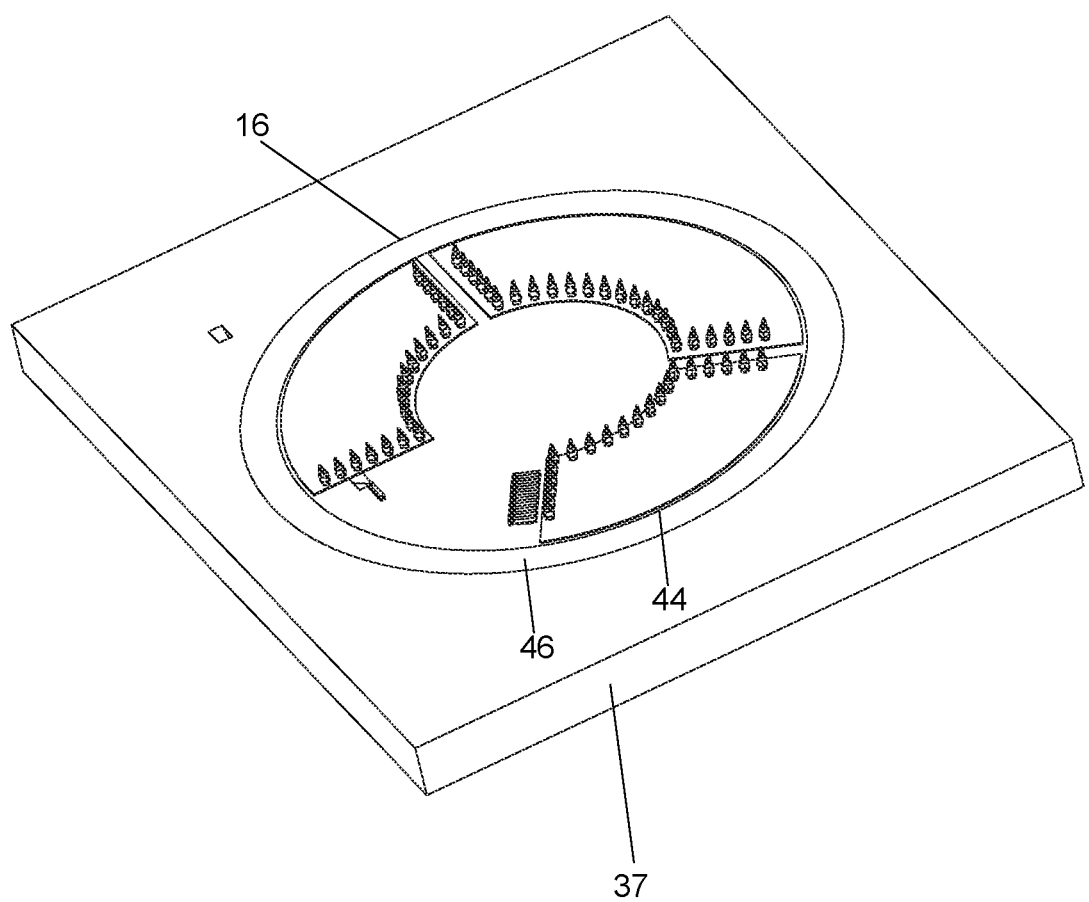
FIG. 3 is a top view of the structure wherein the conductive track is reinforced.
Figure 4:
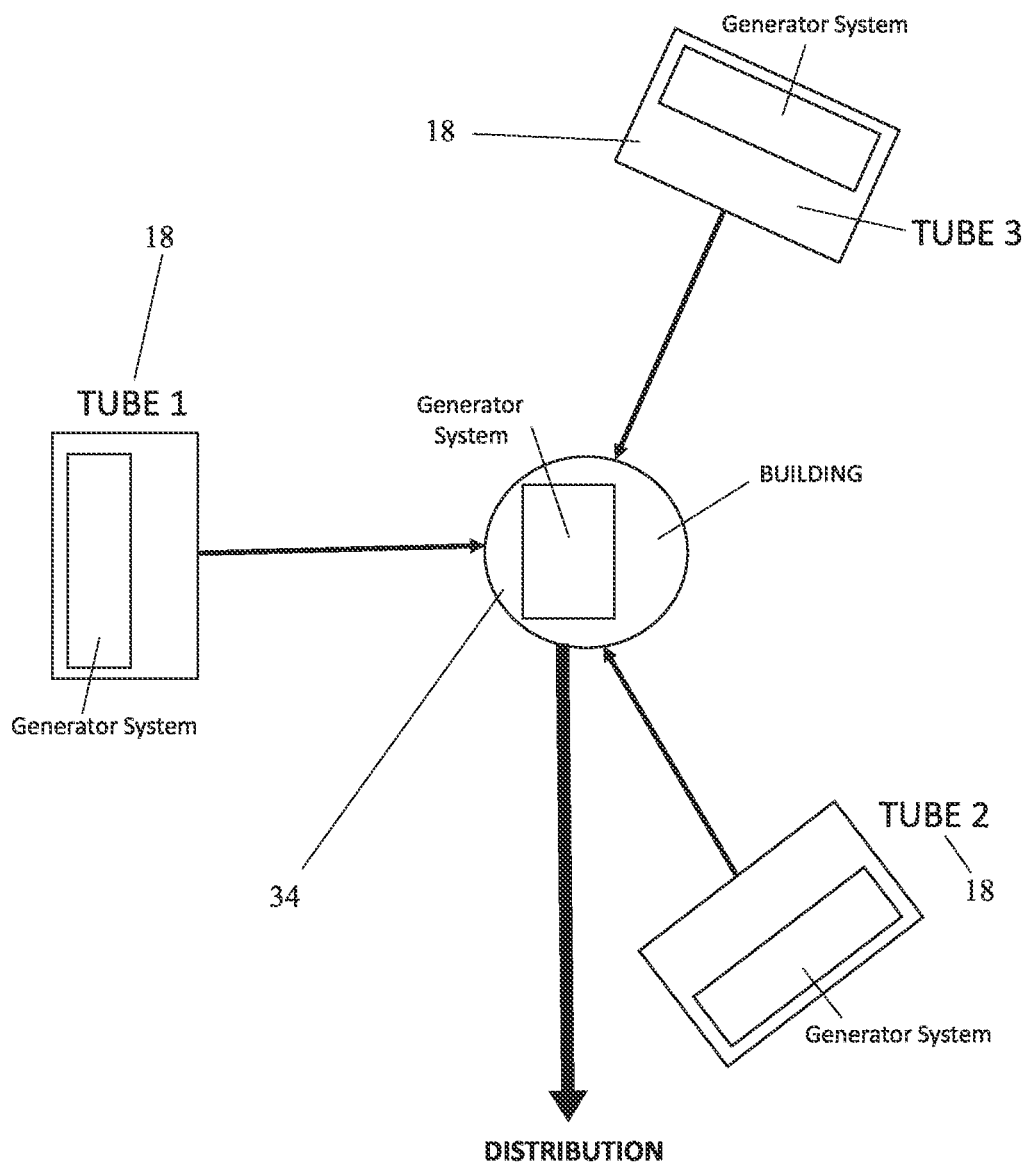
FIG. 4 is a flow chart showing an exemplary layout of the plurality of generators provided in the tubes.
Figure 5:
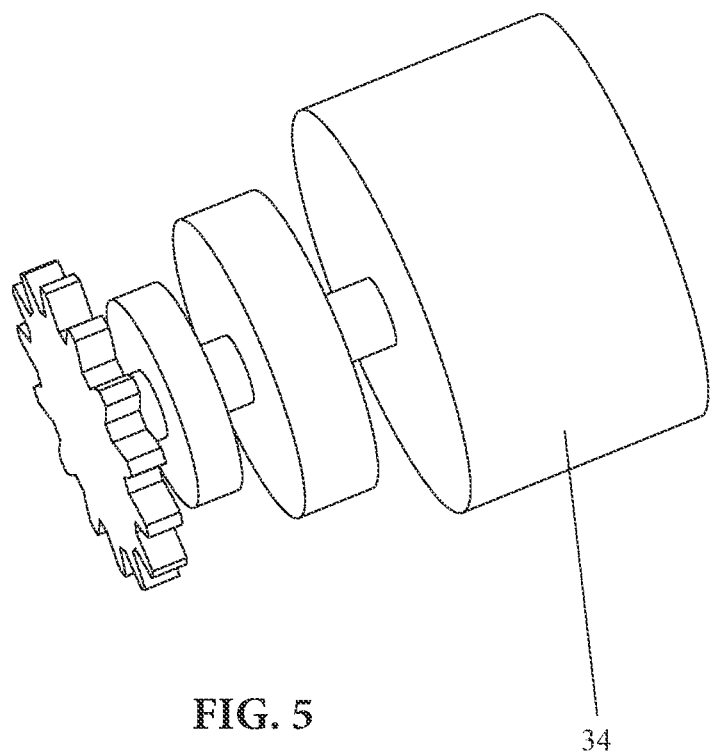
FIG. 5 is an exemplary representation of a generator of standard construction and of the type provided herein.
Figure 6:
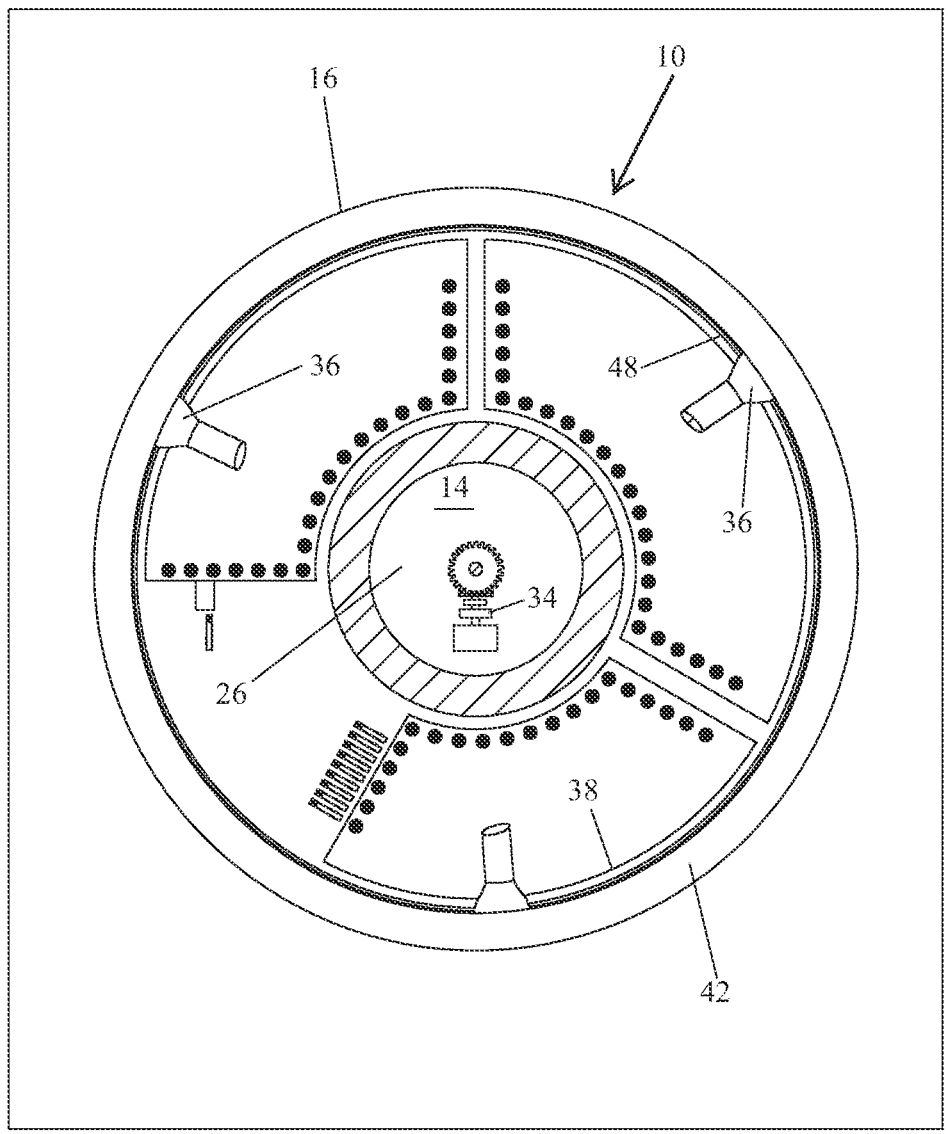
FIG. 6 is a top view of the active wind generator system showing the circumference of the conductive track, the distal ends of the plurality of arms, and an interior view of the central hub.
Figure 7:
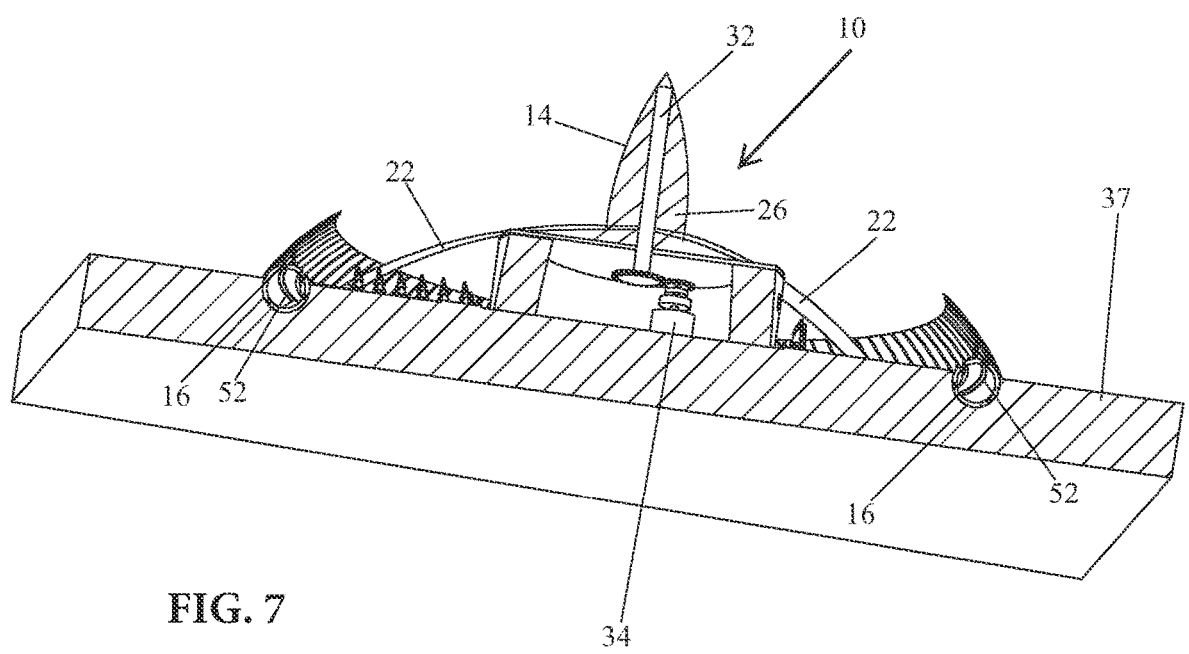
FIG. 7 is a cross sectional view of the conductive track, central hub, and structure wherein the conductive track is reinforced.
Figure 8:
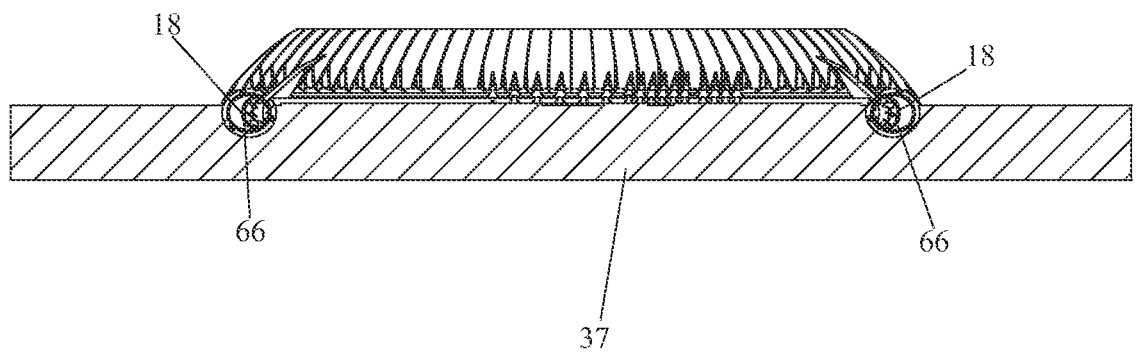
FIG. 8 is a cross sectional view of the tubes in a levitated state within the conductive track.
Figure 9:
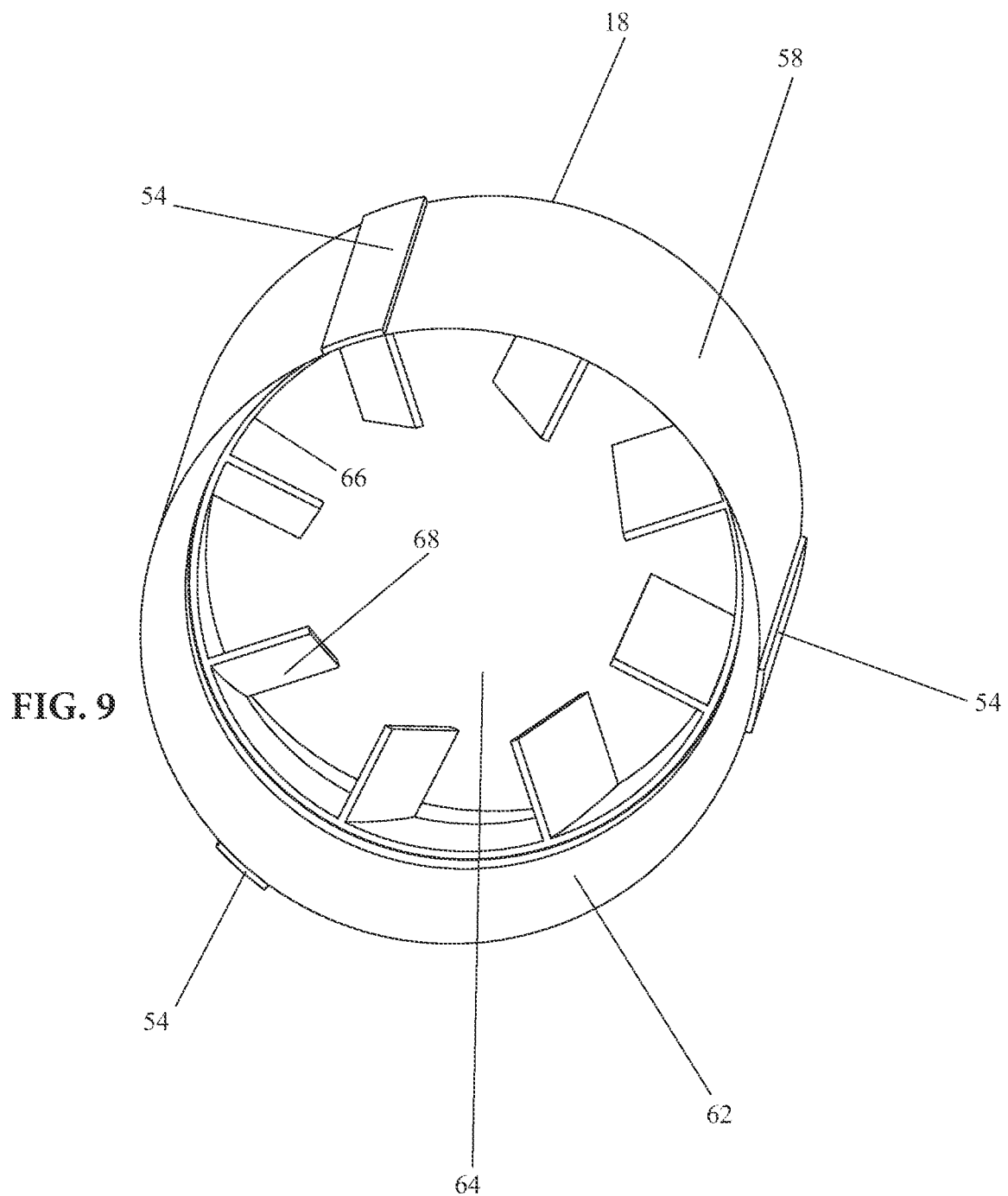
FIG. 9 is an exemplary representation of a tube, a mounted turbine, and the blades provided therein.
Figure 10:
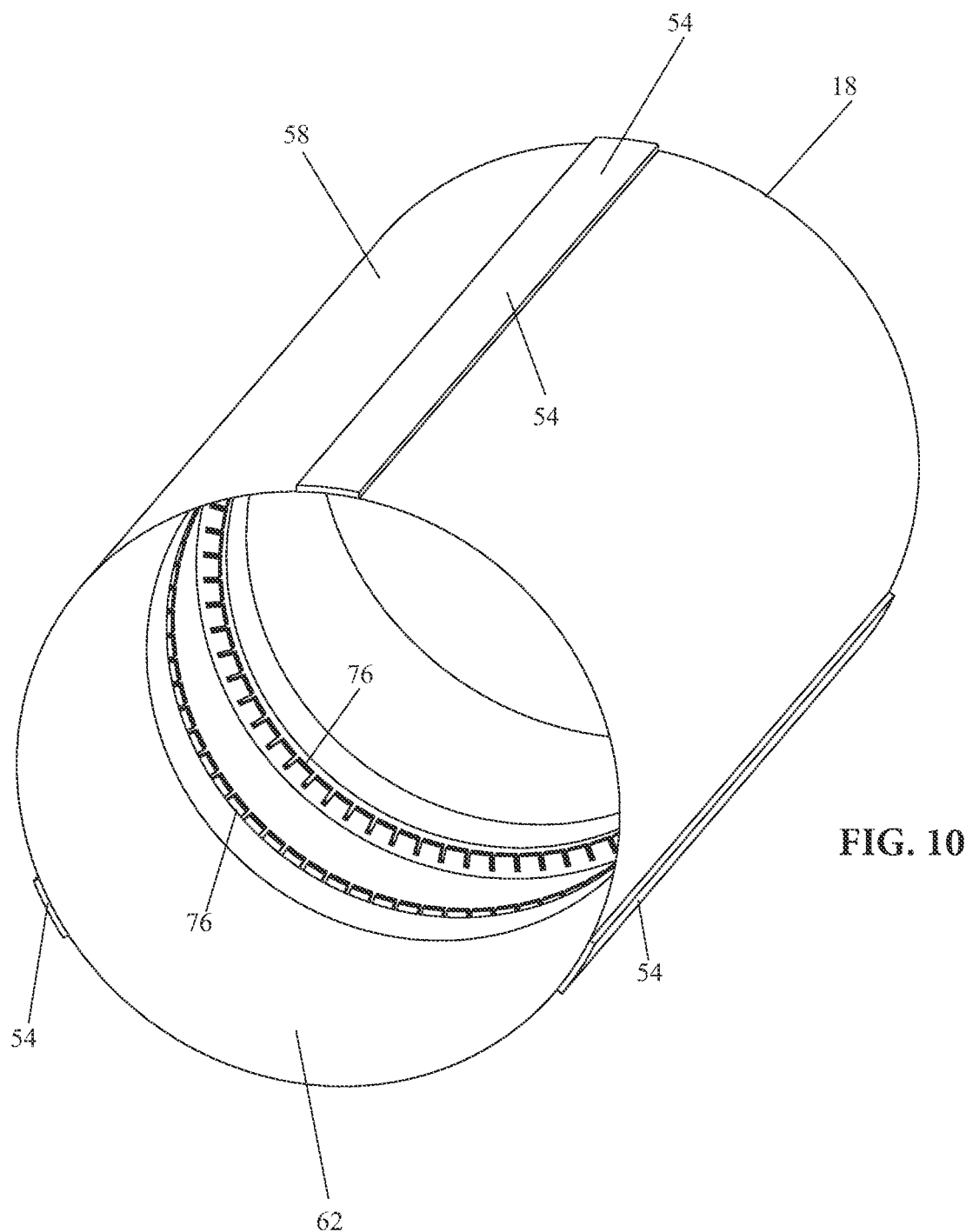
FIG. 10 is an interior view of a tube showing slots provided therein for placement of a turbine.
Figure 11:
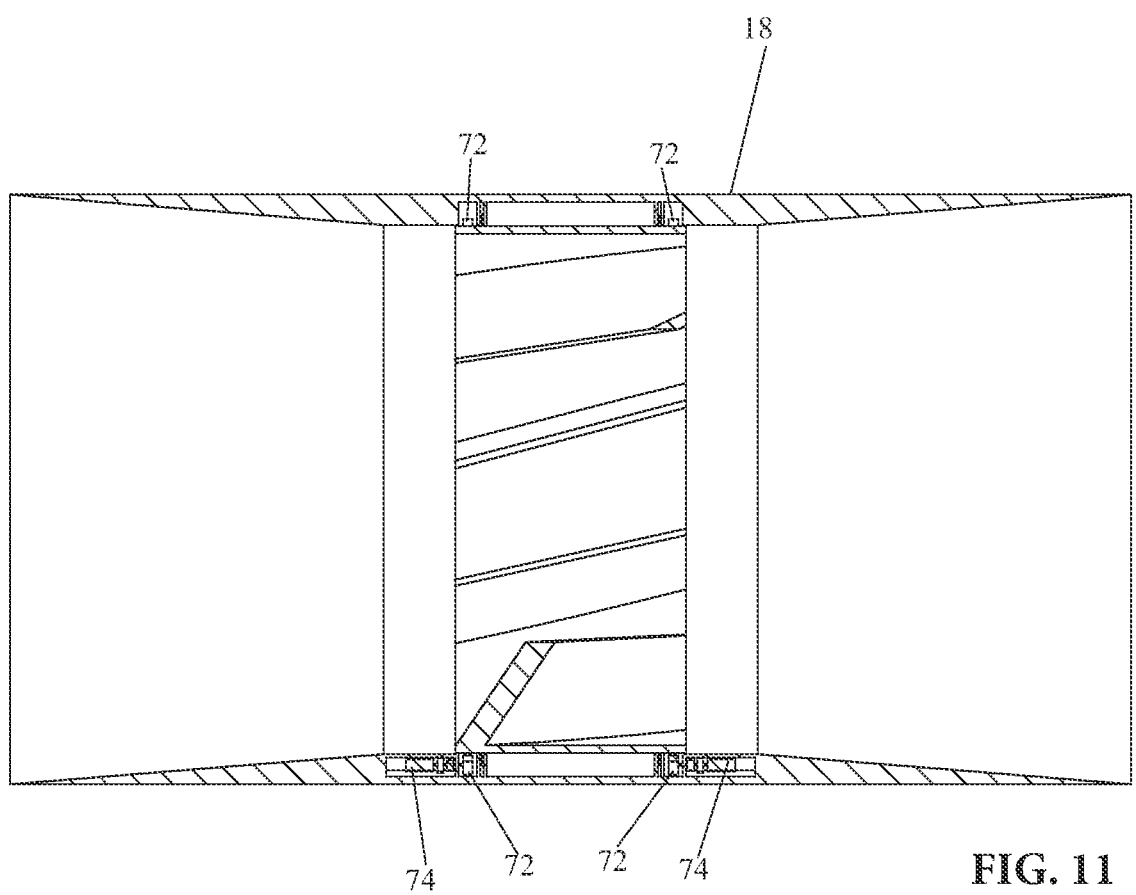
FIG. 11 is cross-sectional view of a tube showing the turbine and the generators associated therewith to produce electricity.
Figure 12:
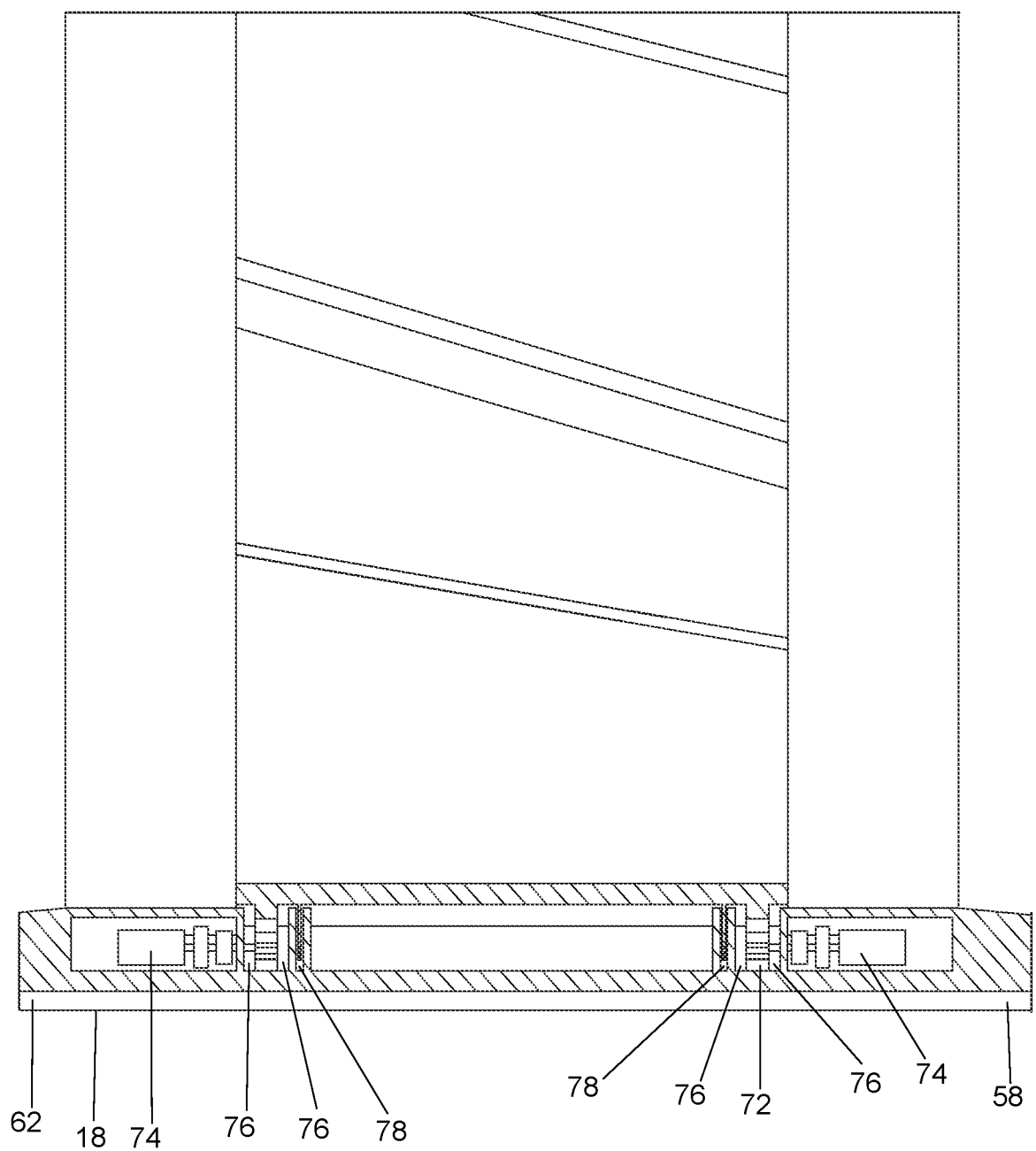
FIG. 12 is an exploded cross-sectional view of an inner wall of a tube.
Figure 13:
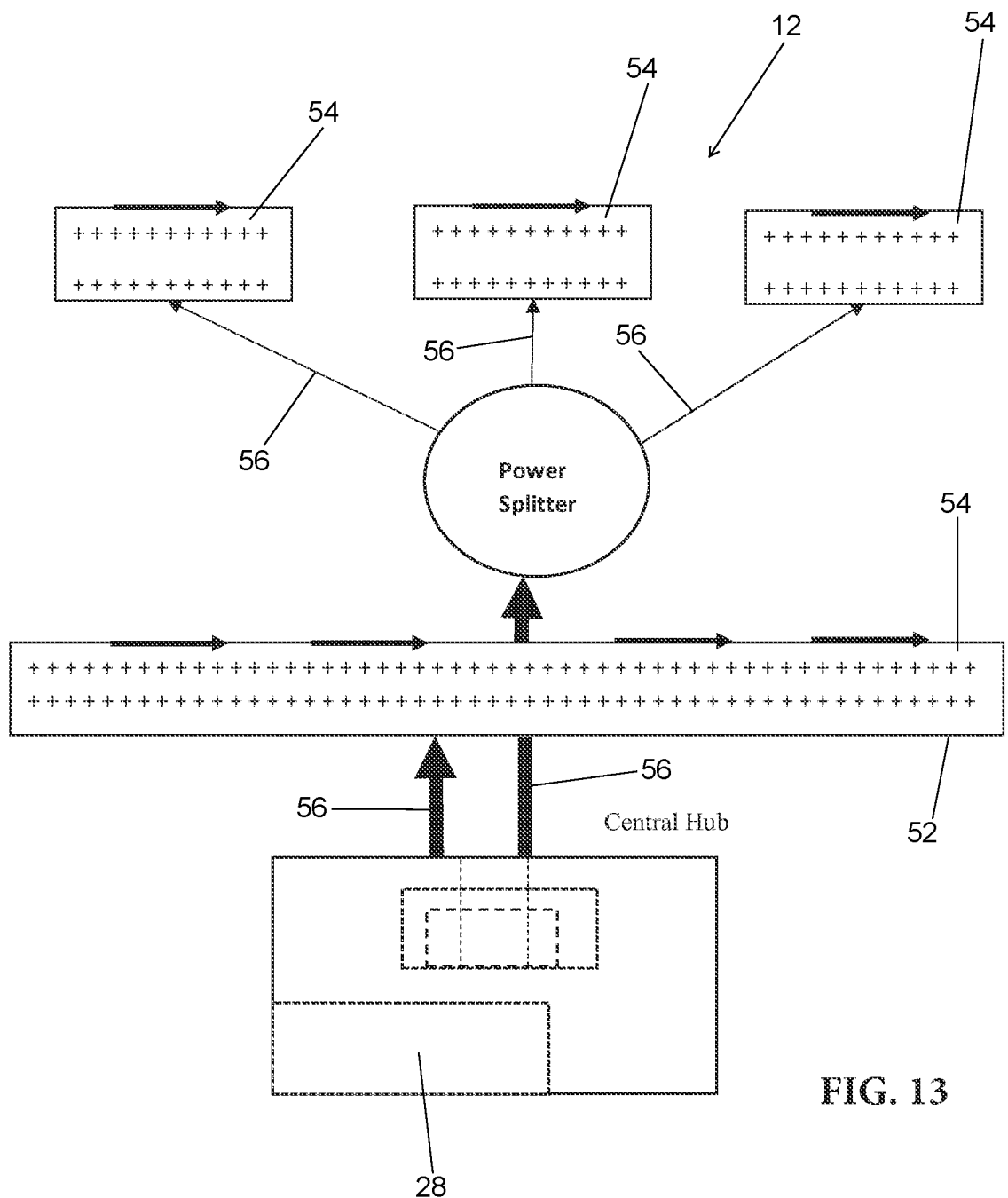
FIG. 13 is a vertical plan view showing the electrical flow for the magnetic sources as provided herein.
Figure 14:
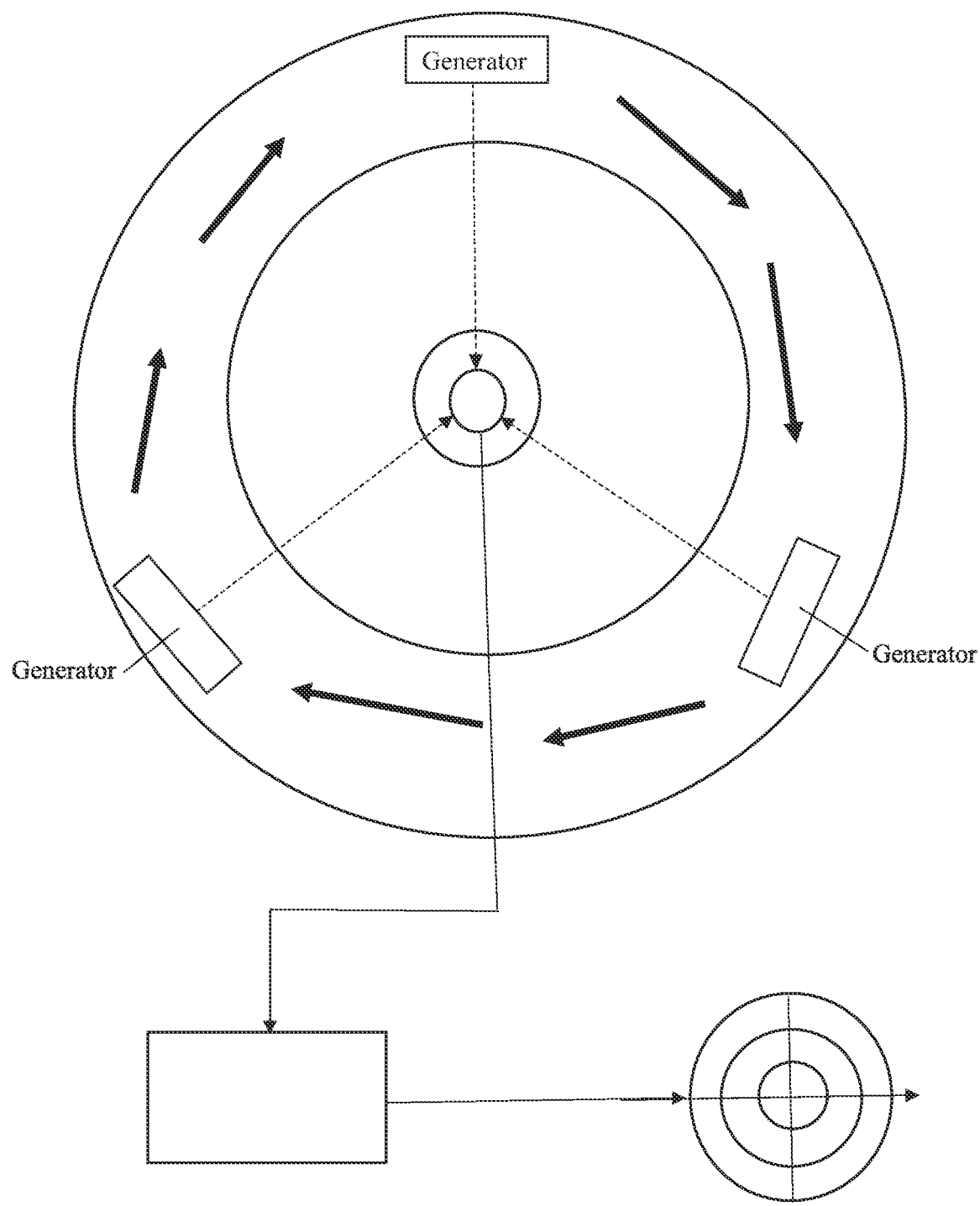
FIG. 14 is a vertical plan view showing the electrical energy production of the constant wind generator as provided herein.
Figure 15:
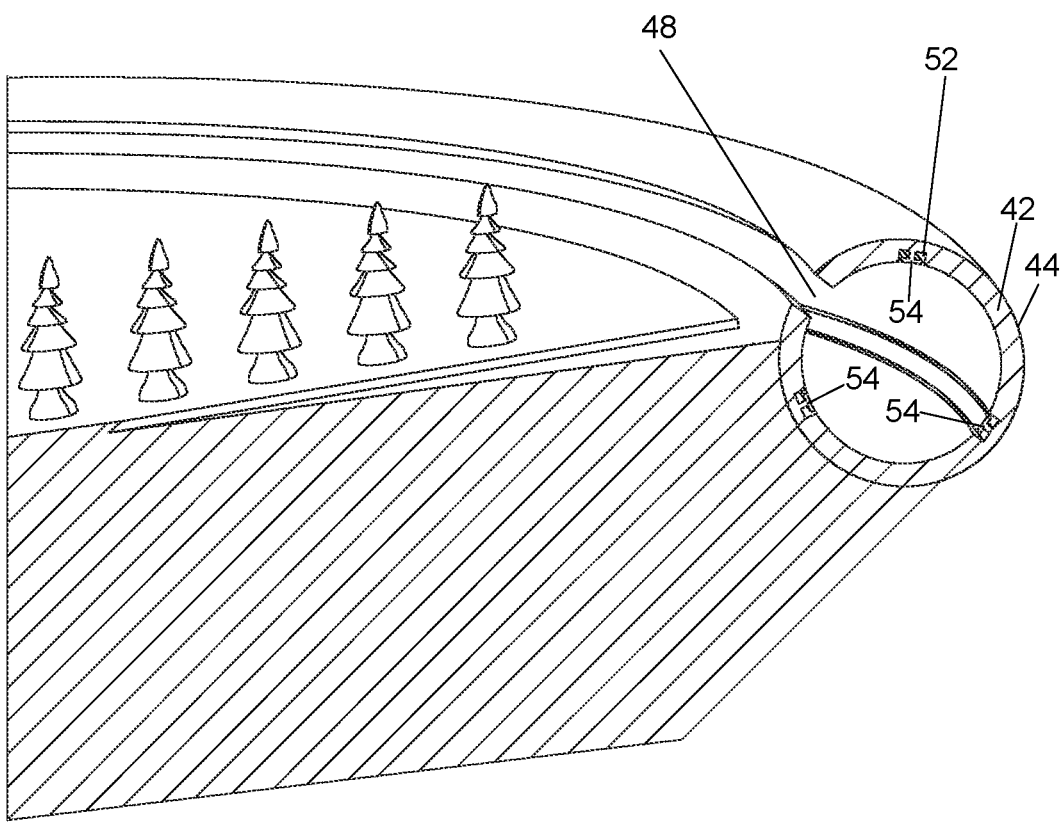
FIG. 15 is an exploded cross-sectional view of the conductive track showing the magnetic field source and the rail.
Figure 16:
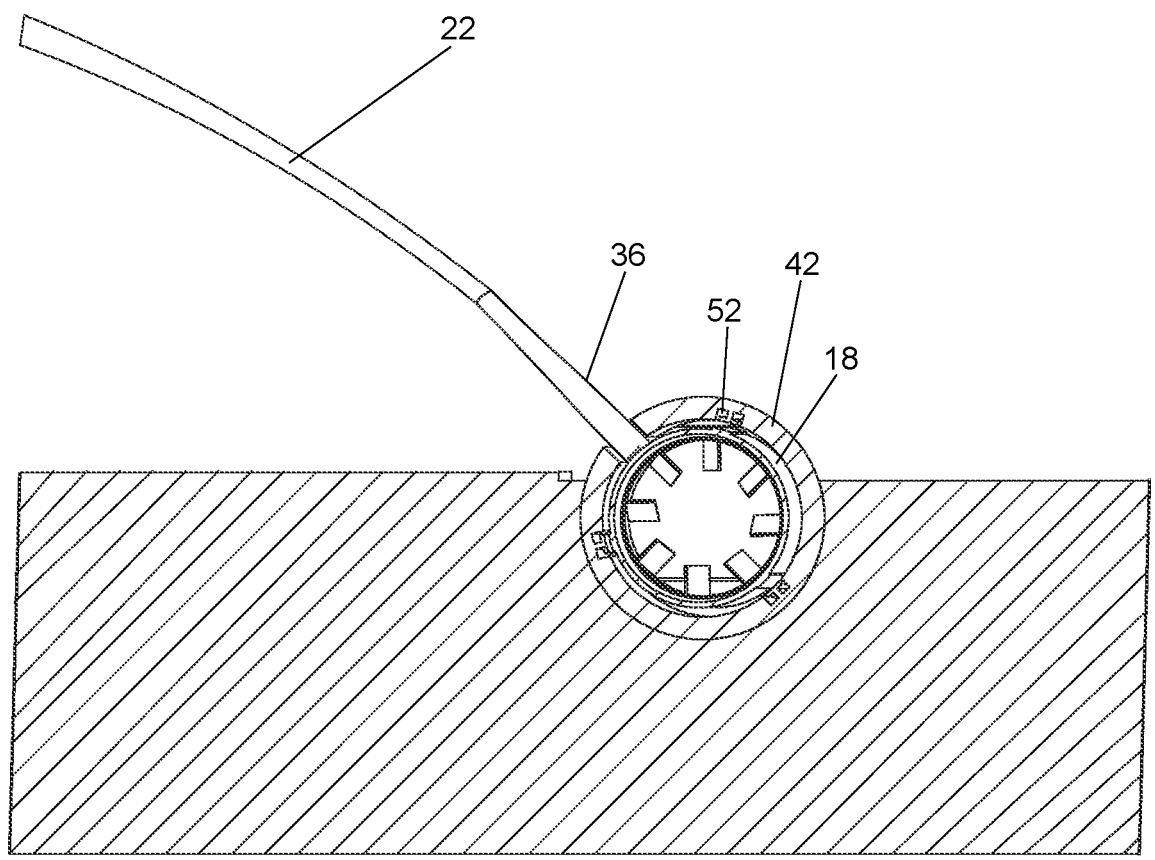
FIG. 16 is an exploded cross-sectional of the interior of the conductive track showing the turbine in a levitated state within a tube.

Referring now to FIGS. 1 through 16, an active wind generator 10 for creating electrical energy using a magnetic levitation electrical system 12 for transfer to a power collection system is shown. The active wind generator 10 comprises a central hub 14, a conductive track 16, and a plurality of tubes 18. The central hub 14 having a plurality of arms 22, a distal end 24, and an interior space for housing a power source 28, a rotatable shaft 32, and a generator 34. The rotatable shaft 32 is centrally connected and centrally extended in the central hub 14 and is connected to the active wind generator 10 to generate electric power. Each of the plurality of arms 22 have proximal ends 36 attached to the rotatable shaft 32 for providing rotation thereto and the arms 22 are provided in a spaced elevational relationship for rotational movement and wherein the arms 22 are attached to each of the plurality of tubes 18 at the distal end 24 of the central hub 14.

The conductive track 16 is of circular configuration and is reinforced to a structure 37. The conductive track 16 further comprising an inner circumference 38, an outer wall 42, an inner wall 44, and a lumen 46. The outer wall 42 having an elongated transverse passage 48 provided on the inner circumference 38 of the conductive track 16 and through which the outer ends of the arms 22 of the central hub 14 extend into the lumen 46 of the conductive track. The inner walls 44 have rails 52 for housing magnetic field sources 54 in a planar configuration therein and wherein the magnetic field sources 54 are electrically connected to the power source 28 for delivering electrical current 56 thereto. Each of the plurality of tubes 18 being comprised of an outer wall 58, an inner wall 62, and a lumen 64. The outer walls 58 of the tubes 18 receive at least one magnetic field source 54 with a magnetic pole orientation and the magnetic field source 54 is identical to the magnetic field source 54 of the conductive track 16 and wherein the magnetic field source 54 being electrically connected to the power collection system. The lumen of each of the plurality of tubes 18 houses at least one turbine 66 having blades 68 for rotation and gears 72 for rotatable attachment to a plurality of generators 74 for the production of electrical energy.

The plurality of generators 74 can be placed in lateral positions along the inner walls 62 of the plurality of tubes 18 and the shaft thereof connected to the gears 74 of the turbines 66. The plurality of tubes 18 can have slots 76 for receiving the gears 74 of the turbines 66 and the turbines 66 being rotatable therein once the conductive track 16 receives electrical current 56 from the power source 28. Additional magnetic field sources 78 of similar magnetism can be provided in the inner walls of the tubes 62 to amplify the rotation of the turbines 66 and the movement of the blades 68. This further enhances the levitation and constant high-speed circular traveling of the tubes 62 and the turbines 66 in the conductive track 16 for constant wind creation and production of electrical energy.

The magnetic field sources 54 on the outer wall of the tubes 58, the conductive track 16, and the inner walls of the tubes 72 are aligned such that the magnetic field sources provided on the 54 and 72 repel the magnetic field source 54 of the conductive track 16 and wherein a propulsive force for the tube is transmitted when electrical current 56 is delivered to the tubes 18 by means of the power source 28 and the magnetic field source of the conductive track and the plurality of tubes 18 interacting so as to induce magnetic field forces for the levitation and circular travel of the plurality of tubes 18 upon changes in the relative position of the plurality of tubes 18 in the conductive track 16 and in relation to the magnetic source. The speed of the rotatable shaft 32 and the gears 72 provided in the plurality of generators 74 can be amplified by the use of a magnetic gear system. Variations of the gear sizes and synchronous motors can be used to realize the propulsion force.

The circular travel thereby creating a stepwise production of electrical energy wherein by rotating the blades of the plurality of turbines 66 which creates the kinetic energy to produce electrical energy for the magnetic source attached on the plurality of tubes 18 and wherein the arms 22 of the central hub 14 rotates the shaft 32 of the central hub 14, the generator of the central hub 14, and the plurality of generators provided in the plurality of tubes 18 convert the kinetic energy into energy electrical energy.

The central hub 14 of the active wind generator 10 is adapted for rotational movement and for retaining the mounted rotatable arms 22 in a spaced elevational relationship in the conductive track 16. To accomplish this, the central hub 14 can be provided with rotatable work carrying devices, electromagnets, or exterior framing that are adapted to support rotational movements or the movement of attached elements along a circular path.

The plurality of the tubes 18 and the conductive track 16 of the active wind generator 10 create an opposing magnetic field and an inward force in the lumen 46 of the conductive track 16 accordingly creating the repulsive force that creates stable levitation for the plurality of tubes 18. Because of this magnetic relationship, the tubes 18 are evenly suspended within the lumen of the conductive track 16 and thereby keeping that portion of the larger structure 37 essentially frictionless and stable levitation can be achieved. The rails 52 are provided in a linear configuration to launch the turbine 66 and accelerate the turbine 66 to a high speed. A magnetic field is created once the rails 52 are connected to the electricity and the turbine is launched upward within the tube. The turbine 66 will be attracted to the center of the tube and attracted forward.

Alternating magnetic polarity can be used to achieve stability of the plurality of tubes 18 during levitation and propulsion in the lumen of the conductive track 16. The magnetic source can be constructed in a manner in which the conductive elements are disposed at equal distances on the rail and with angular placements therebetween.

The plurality of the tubes 18 of the active wind generator 10 is at rest when the electrical current 56 is disconnected. The system can be constructed to measure the current voltage provided in the rails 52 or on the tubes 18 when the active wind generator 10 is at rest and the rest status being calculated by determining a specified voltage.

Certain components necessary to the operation of the active wind generator are not shown or described in detail because they are components well known to those in the relevant arts. These components include requisite components and attachments, computerized monitoring and adjustment means, and software.

While the invention has been described in detail and with reference to specific embodiments thereof, it will be apparent to one skilled in the art that various changes and modifications can be made therein without departing from the spirit and scope thereof.

What is claimed is:

1. An active wind generator for creating electrical energy using a magnetic levitation electrical production system for transfer to a power collection system, the active wind generator comprising:

a central hub, a conductive track, and a plurality of tubes;

the central hub having a plurality of arms, a distal end, and an interior space for housing a power source, a rotatable shaft, and a generator;

the rotatable shaft being centrally connected and centrally extended in the central hub and being connected to the generator to generate electric power, each of the plurality of arms having proximal ends attached to the rotatable shaft for providing rotation thereto, and the plurality of arms being provided in a spaced elevational relationship for rotational movement and wherein the plurality of arms are attached to each of the plurality of tubes at the distal end of the central hub;

the conductive track being of circular configuration and being reinforced to a structure, the conductive track further comprising an inner circumference, an outer wall, an inner wall, and a lumen, the outer wall having an elongated transverse passage provided on the inner circumference of the conductive track and through which the proximal ends of the plurality of arms of the central hub extend into the lumen of the conductive track, the inner walls having rails for housing magnetic field sources in a planar configuration therein and wherein the magnetic field sources are electrically connected to the power source for delivering electrical current thereto;

each of the plurality of tubes being comprised of an outer wall, an inner wall, a plurality of generators, and a lumen, the outer wall receiving at least one magnetic field source with a magnetic pole orientation and the magnetic field source is identical to the magnetic field source of the conductive track and the magnetic field source being electrically connected to the power collection system, the lumen of each of the plurality of tubes housing a turbine having blades for rotation and gears for rotatable attachment to the generator provided in the inner walls of the plurality of tubes for the production of electrical energy;

the magnetic field source of the plurality of tubes and the conductive track are aligned such that the magnetic field source of the plurality of tubes repels the magnetic field source of the conductive track and wherein a propulsive force for the plurality of tubes is transmitted when electrical current is delivered to the conductive track by means of the power source and the magnetic field source of the conductive track and the plurality of tubes interacting so as to induce magnetic field forces for the levitation and circular travel of the plurality of tubes upon changes in the relative position of the plurality of tubes in the conductive track and in relation to the magnetic source; and The circular travel thereby creating a stepwise production of electrical energy wherein by rotating the blades of the turbine which creates the kinetic energy to produce electrical energy for the magnetic source attached on the plurality of tubes and wherein the plurality of arms of the central hub rotate the shaft of the central hub, the generator of the central hub and the plurality of generators in the plurality of tubes convert the kinetic energy into electrical energy and transfer of the electrical energy to a power collection system.

2. The active wind generator of claim 1 wherein the central hub of the active wind generator is adapted for rotational movement and for retaining the plurality of arms in a spaced elevational relationship in the conductive track.

3. The active wind generator of claim 1 wherein the plurality of the tubes and the conductive track of the active wind generator create an opposing magnetic field in the lumen of the conductive track and thereby creating the repulsive force that is a levitation, propulsion, and stability for the plurality of tubes.

4. The wind generator of claim 1 wherein the plurality of the tubes of the wind generator are at rest when the electrical current is disconnected.

5. A method for creating electrical energy using a magnetic levitation electrical production system for transfer to a power collection system, the method comprising the steps of:

providing a central hub, a conductive track, and a plurality of tubes;

equipping the central hub with a plurality of arms, a distal end, and an interior space for housing a power source, a rotatable shaft, and a generator;

centrally connected and centrally extending in the central hub the rotatable shaft and the rotatable being connected to the generator to generate electric power, each of the plurality of arms having proximal ends attached to the rotatable shaft for providing rotation thereto, and the plurality of arms being provided in a spaced elevational relationship for rotational movement and wherein the plurality of arms are attached to each of the plurality of tubes at the distal end of the central hub;

providing the conductive track with a circular configuration and the conductive track being reinforced to a structure, the conductive track further comprising an inner circumference, an outer wall, an inner wall, and a lumen, the outer wall having an elongated transverse passage provided on the inner circumference of the conductive track and through which the proximal ends of the plurality of arms of the central hub extend into the lumen of the conductive track, the inner walls having rails for housing magnetic field sources in a planar configuration therein and wherein the magnetic field sources are electrically connected to the power source for delivering electrical current thereto;

providing the plurality of tubes with an outer wall, an inner wall, a plurality of generators, and a lumen, the outer wall receiving at least one magnetic field source with a magnetic pole orientation and the magnetic field source is identical to the magnetic field source of the conductive track and the magnetic field source being electrically connected to the power collection system, the lumen of each of the plurality of tubes housing a turbine having blades for rotation and gears for rotatable attachment to the generator there between for the production of electrical energy;

aligning the magnetic field source of the plurality of tubes and the conductive track such that the magnetic field source of the plurality of tubes repels the magnetic field source of the conductive track and wherein a propulsive force for the plurality of tubes is transmitted when electrical current is delivered to the conductive track by means of the power source and the magnetic field source of the conductive track and the plurality of tubes interacting so as to induce magnetic field forces for the levitation (suspension) and circular travel of the plurality of tubes upon changes in the relative position of the plurality of tubes in the conductive track and in relation to the magnetic source; and creating by the circular travel a stepwise production of electrical energy wherein by rotating the blades of the turbine the plurality of tubes create the kinetic energy to produce electrical energy for the magnetic source attached on the plurality of tubes and wherein the plurality of arms of the central hub rotate the shaft of the central hub, the generator of the central hub and the plurality of generators in the plurality of tubes convert the kinetic energy into electrical energy and transfer of the electrical energy to a power collection system.

\* \* \* \* \*